US009543582B2

(12) United States Patent
Jun et al.

(10) Patent No.: US 9,543,582 B2
(45) Date of Patent: *Jan. 10, 2017

(54) METHOD FOR PREPARING LITHIUM IRON PHOSPHATE NANOPOWDER

(71) Applicant: LG Chem, Ltd., Seoul (KR)

(72) Inventors: In Kook Jun, Daejeon (KR); Seung Beom Cho, Daejeon (KR); Myoung Hwan Oh, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/510,356

(22) Filed: Oct. 9, 2014

(65) Prior Publication Data

US 2015/0024265 A1   Jan. 22, 2015

Related U.S. Application Data

(63) Continuation of application No. PCT/KR2014/000271, filed on Jan. 9, 2014.

(30) Foreign Application Priority Data

Jan. 10, 2013 (KR) .................. 10-2013-0003032
May 16, 2013 (KR) .................. 10-2013-0055476
Jan. 8, 2014 (KR) .................. 10-2014-0002574

(51) Int. Cl.
    *C01B 25/45*   (2006.01)
    *H01M 4/58*    (2010.01)
    (Continued)

(52) U.S. Cl.
    CPC ............ *H01M 4/5825* (2013.01); *C01B 25/45* (2013.01); *H01M 4/0402* (2013.01);
    (Continued)

(58) Field of Classification Search
    None
    See application file for complete search history.

(56) References Cited

U.S. PATENT DOCUMENTS

5,747,193 A    5/1998   Gerand et al.
7,390,472 B1   6/2008   Singhal et al.
(Continued)

FOREIGN PATENT DOCUMENTS

CN    1803591 A     7/2006
CN    101007630 A   8/2007
(Continued)

OTHER PUBLICATIONS

International Search Report from PCT/KR2014/000271 dated Apr. 24, 2014.
(Continued)

*Primary Examiner* — Wayne Langel
(74) *Attorney, Agent, or Firm* — Lerner, David, Littenberg, Krumholz & Mentlik, LLP

(57) ABSTRACT

The present invention relates to a method for preparing a lithium iron phosphate nanopowder, including the steps of (a) preparing a mixture solution by adding a lithium precursor, an iron precursor and a phosphorus precursor in a triethanolamine solvent, and (b) putting the mixture solution into a reactor and heating to prepare the lithium iron phosphate nanopowder under pressure conditions of 1 bar to 10 bar, and a lithium iron phosphate nanopowder prepared by the method. When compared to a common hydrothermal synthesis method, a supercritical hydrothermal synthesis method and a glycothermal synthesis method, a reaction may be performed under a relatively lower pressure. Thus, a high temperature/high pressure reactor is not necessary and process safety and economic feasibility may be secured. In addition, a lithium iron phosphate nanopowder having
(Continued)

US 9,543,582 B2

Page 2 uniform particle size and effectively controlled particle size distribution may be easily prepared.

10 Claims, 3 Drawing Sheets

(51) Int. Cl.
    H01M 4/36      (2006.01)
    H01M 4/04      (2006.01)
    H01M 4/136     (2010.01)
    H01M 4/587     (2010.01)
    H01M 10/052    (2010.01)
    H01M 4/02      (2006.01)
    H01M 4/62      (2006.01)

(52) U.S. Cl.
    CPC ......... H01M 4/136 (2013.01); H01M 4/366 (2013.01); H01M 4/587 (2013.01); C01P 2002/30 (2013.01); C01P 2002/72 (2013.01); C01P 2004/03 (2013.01); C01P 2004/51 (2013.01); C01P 2004/64 (2013.01); H01M 4/625 (2013.01); H01M 10/052 (2013.01); H01M 2004/028 (2013.01); Y02P 20/544 (2015.11); Y10T 428/2982 (2015.01)

(56) References Cited

U.S. PATENT DOCUMENTS

| | | | |
|---|---|---|---|
| 8,771,877 B2* | 7/2014 | Yasunaga | C01B 31/02 252/521.2 |
| 9,065,135 B2* | 6/2015 | Choy | B60L 11/1879 |
| 2004/0157126 A1* | 8/2004 | Belharouak | H01M 4/136 429/231.8 |
| 2006/0035150 A1 | 2/2006 | Audemer et al. | |
| 2006/0263286 A1 | 11/2006 | Wu et al. | |
| 2007/0054187 A1 | 3/2007 | Nuspl et al. | |
| 2007/0148082 A1 | 6/2007 | Heidelberg et al. | |
| 2009/0035204 A1 | 2/2009 | Xu et al. | |
| 2009/0117020 A1 | 5/2009 | Manthiram et al. | |
| 2009/0186275 A1 | 7/2009 | Exnar et al. | |
| 2009/0233096 A1 | 9/2009 | Schall et al. | |
| 2010/0013720 A1 | 1/2010 | Sakata et al. | |
| 2010/0074822 A1* | 3/2010 | Chung | B82Y 30/00 423/306 |
| 2010/0183924 A1 | 7/2010 | Song et al. | |
| 2010/0248022 A1 | 9/2010 | Shirakata et al. | |
| 2010/0261060 A1 | 10/2010 | Choy et al. | |
| 2010/0279117 A1 | 11/2010 | Gu | |
| 2011/0017947 A1 | 1/2011 | Nuspl et al. | |
| 2011/0037019 A1 | 2/2011 | Nakano et al. | |
| 2011/0037030 A1* | 2/2011 | Holzapfel | B82Y 30/00 252/507 |
| 2011/0091772 A1 | 4/2011 | Mishima et al. | |
| 2011/0104553 A1 | 5/2011 | Pol et al. | |
| 2012/0003540 A1 | 1/2012 | Nakano et al. | |
| 2012/0058039 A1 | 3/2012 | Huang | |
| 2012/0231334 A1* | 9/2012 | Kinoshita | B82Y 30/00 429/211 |
| 2012/0328947 A1 | 12/2012 | Chou et al. | |
| 2013/0029226 A1 | 1/2013 | Noh et al. | |
| 2013/0136989 A1 | 5/2013 | Wang et al. | |
| 2013/0137009 A1 | 5/2013 | Jin et al. | |
| 2013/0157134 A1 | 6/2013 | Kintaka | |
| 2013/0209865 A1 | 8/2013 | Kim et al. | |
| 2014/0234195 A1* | 8/2014 | Kisailus | H01M 4/139 423/306 |
| 2014/0239235 A1* | 8/2014 | Kong | C01B 25/45 252/506 |
| 2015/0024265 A1 | 1/2015 | Jun et al. | |
| 2015/0024266 A1 | 1/2015 | Jun et al. | |
| 2015/0024271 A1* | 1/2015 | Jun | H01M 4/5825 429/221 |
| 2015/0030918 A1 | 1/2015 | Jun et al. | |
| 2015/0037665 A1 | 2/2015 | Jun et al. | |
| 2015/0037666 A1 | 2/2015 | Jun et al. | |
| 2015/0118561 A1* | 4/2015 | Gauthier | C01B 25/45 429/221 |
| 2015/0236349 A1* | 8/2015 | Chiang | H01M 4/5825 429/221 |
| 2015/0280236 A1 | 10/2015 | Jun et al. | |
| 2015/0333329 A1 | 11/2015 | Jun et al. | |
| 2015/0357633 A1 | 12/2015 | Jun et al. | |

FOREIGN PATENT DOCUMENTS

| | | | |
|---|---|---|---|
| CN | 101415640 A | 4/2009 | |
| CN | 101591012 A | 12/2009 | |
| CN | 101630773 A | 1/2010 | |
| CN | 101635352 A | 1/2010 | |
| CN | 101719548 A | 6/2010 | |
| CN | 101777648 A | 7/2010 | |
| CN | 101847742 A | 9/2010 | |
| CN | 101944601 A | 1/2011 | |
| CN | 102299322 A | 12/2011 | |
| CN | 102356488 A | 2/2012 | |
| CN | 102367170 A | 3/2012 | |
| CN | 102420324 A | 4/2012 | |
| CN | 102544488 A | 7/2012 | |
| CN | 102790216 A | 11/2012 | |
| EP | 2413402 A1 | 2/2012 | |
| EP | 2413462 A1 | 2/2012 | |
| EP | 2562859 A2 | 2/2013 | |
| JP | 2002293517 A | 10/2002 | |
| JP | 2005-116393 | * 4/2005 | |
| JP | 2006524623 A | 11/2006 | |
| JP | 2007-511458 A | 5/2007 | |
| JP | 2008103094 A | 5/2008 | |
| JP | 2008-130526 A | 6/2008 | |
| JP | 4223463 B2 | 2/2009 | |
| JP | 2009-532323 A | 9/2009 | |
| JP | 2010251302 A | 11/2010 | |
| JP | 2011181452 A | 9/2011 | |
| JP | 2012-123909 A | 6/2012 | |
| JP | 2012155916 A | 8/2012 | |
| JP | 2012167314 A | 9/2012 | |
| JP | 2012195156 A | 10/2012 | |
| JP | 2015-527290 A | 9/2015 | |
| JP | 2015-527291 A | 9/2015 | |
| JP | 2015-530965 A | 10/2015 | |
| JP | 2015531738 A | 11/2015 | |
| JP | 2015532632 A | 11/2015 | |
| KR | 10-2007-0108664 A | 11/2007 | |
| KR | 10-0808446 B1 | 3/2008 | |
| KR | 10-0939647 B1 | 2/2010 | |
| KR | 10-0940979 B1 | 2/2010 | |
| KR | 10-1003136 B1 | 12/2010 | |
| KR | 2011-0007112 A | 1/2011 | |
| KR | 2011-0063390 A | 6/2011 | |
| KR | 2011-0071653 A | 6/2011 | |
| KR | 2011-0117629 A | 10/2011 | |
| KR | 2011-0132566 A | 12/2011 | |
| KR | 2012-0034060 A | 4/2012 | |
| KR | 2012-0038843 A | 4/2012 | |
| KR | 2012-0123585 A | 11/2012 | |
| TW | 201301644 A | 1/2013 | |
| WO | 2007-113624 A1 | 10/2007 | |
| WO | 2009131095 A1 | 10/2009 | |
| WO | 2011132961 A2 | 10/2011 | |
| WO | 2012-023439 A1 | 2/2012 | |

OTHER PUBLICATIONS

International Search Report from PCT/KR2014/000269 dated Apr. 28, 2014.
International Search Report from PCT/KR2014/000268 dated Apr. 17, 2014.
International Search Report from PCT/KR2014/000267 dated Apr. 28, 2014.
International Search Report from PCT/KR2014/000274 dated Apr. 24, 2014.

(56) References Cited

OTHER PUBLICATIONS

International Search Report from PCT/KR2014/000275 dated Apr. 24, 2014.
International Search Report for Application No. PCT/KR2014/000264 dated Apr., 23, 2014.
International Search Report for Application No. PCT/KR2014/000262 dated Apr. 22, 2014.
International Search Report for Application No. PCT/KR2014/000265 dated Apr. 22, 2014.
Jozwiak et al., "The thermal stability, local structure and electrical properties of lithium-iron phosphate glasses", Material Science—Poland, vol. 27, No. 1, 2009, pp. 307-318.
Kim, Dong-Han, et al., Synthesis of LiFePO4 Nanoparticles in Polyol Medium and Their Electrochemical Properties, Electrochemical Solid-State Letters, 2006, vol. 9, No. 9, pp. 439-442.
Extended Search Report from European Application No. 14738215.4, dated Nov. 11, 2015.
Extended Search Report from European Application No. 14738106.5, dated Nov. 9, 2015.
Extended Search Report from European Application No. 14738008.3, dated Nov. 9, 2015.
Extended Search Report from European Application No. 14737816.0, dated Sep. 16, 2015.
Extended Search Report from European Application No. 14737874.9, dated Sep. 15, 2015.
Extended Search Report from European Application No. 14738037.2, dated Sep. 21, 2015.
Extended Search Report from European Application No. 14737518.2, dated Sep. 16, 2015.
Extended Search Report from European Application No. 14738003.4, dated Sep. 21, 2015.
Office Action from Chinese Application No. 201480002200.9, dated Nov. 12, 2015.
Office Action from Chinese Application No. 201480002313.9, dated Nov. 20, 2015.

* cited by examiner

METHOD FOR PREPARING LITHIUM IRON PHOSPHATE NANOPOWDER

CROSS-REFERENCE TO RELATED APPLICATIONS

The present application is a continuation of International Application No. PCT/KR2014/000271 filed Jan. 9, 2014, which claims priority from Korean Application Nos. 10-2014-0002574 filed Jan. 8, 2014, 10-2013-0055476 filed May 16, 2013, and 10-2013-0003032 filed Jan. 10, 2013, the disclosures of which are hereby incorporated herein by reference.

BACKGROUND OF THE INVENTION

Field of the Invention

The present invention relates to a method for preparing a lithium iron phosphate nanopowder.

Description of the Related Art

As technical development and consumption of mobile devices increase, the demand for secondary batteries as energy sources is suddenly increasing. Among such secondary batteries, lithium secondary batteries having high energy density and voltage, a long life cycle, and a low self-discharge rate are being commercialized and widely used.

Common lithium secondary batteries use lithium cobalt oxide ($LiCoO_2$) as the main component of a cathode active material. However, since the cobalt oxide containing lithium is unstable and expensive, the mass production of lithium secondary batteries including thereof is difficult.

Recently, lithium iron phosphate ($LiFePO_4$) compound having a voltage against lithium of ~3.5 V, a high volume density of 3.6 g/cm$^3$, and a theoretical capacity of 170 mAh/g, as well as good stability at high temperature, and being cheap when compared to the lithium cobalt oxide, is being viewed as a suitable cathode active material for a lithium secondary battery.

As methods for preparing the lithium iron phosphate compound, a solid-state reaction method or a liquid-state reaction method such as a hydrothermal synthesis method and a supercritical hydrothermal synthesis is known. Recently, a glycothermal synthesis method is using a non-aqueous solvent such as ethylene glycol or diethylene glycol as a reaction solvent has been developed. According to the hydrothermal synthesis method and the supercritical hydrothermal synthesis method, the preparation of the lithium iron phosphate nanopowder is performed under high temperature and high pressure conditions, giving rise to safety concerns. In addition, according to the glycothermal synthesis method, the control of the particle size and the particle size distribution of the lithium iron phosphate nanopowder may be difficult.

SUMMARY OF THE INVENTION

An aspect of the present invention provides a method for preparing a lithium iron phosphate nanopowder using a novel reaction solvent to resolve the above-described limitations, by which a reaction may be performed under relatively low pressure conditions when compared to a common hydrothermal synthesis method, a supercritical hydrothermal synthesis method, or a glycothermal synthesis method. Thus, a high temperature/high pressure reactor may not be used, so that process safety and economic feasibility may be secured, while uniform particle size may be obtained and a particle size distribution may be controlled.

According to an aspect of the present invention, there is provided a method for preparing a lithium iron phosphate nanopowder including (a) preparing a mixture solution by adding a lithium precursor, an iron precursor and a phosphorus precursor in a triethanolamine solvent, and (b) putting the reaction mixture into a reactor and heating to form a lithium iron phosphate nanopowder under pressure conditions of 1 bar to 10 bar.

According to another aspect of the present invention, there is provided a lithium iron phosphate nanopowder prepared by the method, and a cathode active material including the same.

According to still another aspect of the present invention, there is provided a cathode including the cathode active material and a lithium secondary battery including the cathode.

According to the method for preparing a lithium iron phosphate nanopowder of the present invention, a reaction may be performed under relatively lower pressure conditions when compared to a common hydrothermal synthesis method, a supercritical hydrothermal synthesis method and a glycothermal synthesis method, such that a high temperature/high pressure reactor may not be used and so, process safety and economic feasibility may be secured, while uniform particle size may be obtained and particle size distribution may be controlled.

A lithium secondary battery including the lithium iron phosphate nanopowder thus prepared as a cathode active material has good capacity and stability.

DETAILED DESCRIPTION OF THE PREFERRED EMBODIMENT

Figure 1:
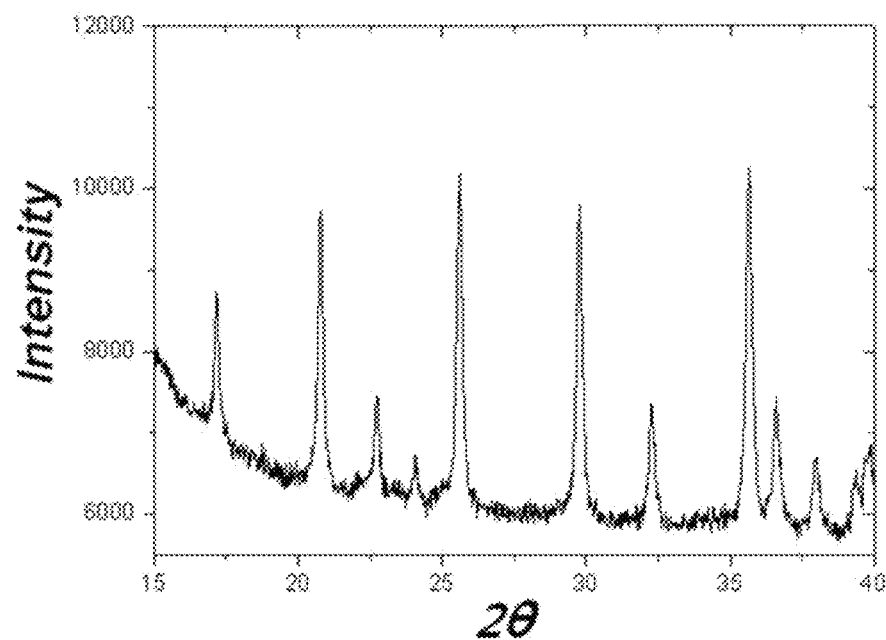
FIG. 1 is an X-ray diffraction (XRD) pattern of a lithium iron phosphate nanopowder prepared according to an embodiment of the present invention (Example 1)

Exemplary embodiments of the present invention will now be described in detail.

In the present invention, a method for preparing a lithium iron phosphate nanopowder using a novel reaction solvent under relatively low pressure conditions, is provided to resolve the safety issue and high cost brought about in a hydrothermal synthesis method, a supercritical hydrothermal synthesis method, or a glycothermal synthesis method, in which a reaction is performed under high temperature/high pressure conditions, so an high temperature/high pressure reactor (for example, autoclave) is used. According to the present invention, process safety and the economic feasibility may be largely improved when compared to the common hydrothermal synthesis method, the supercritical hydrothermal synthesis method, or the glycothermal synthesis method, and a lithium iron phosphate nanopowder having uniform particle size may be obtained.

In an embodiment for attaining an aspect of the invention, a method for preparing a lithium iron phosphate nanopowder including (a) preparing a mixture solution by adding a lithium precursor, an iron precursor and a phosphorus precursor in a triethanolamine solvent, and (b) putting the reaction mixture into a reactor and heating to form a lithium iron phosphate nanopowder under pressure conditions of 1 bar to 10 bar, is provided.

In another embodiment of the present invention, the method may further include (c) heat treating the lithium iron phosphate nanopowder thus prepared to form a coating layer on a portion or the whole of the surface of the individual particle of the nanopowder.

First, a lithium precursor, an iron precursor, and a phosphorus precursor are prepared and added in a reaction solvent to prepare a homogeneous mixture solution (Step (a)).

The lithium precursor thus added may be at least one selected from the group consisting of lithium acetate dihydrate ($CH_3COOLi.2H_2O$), lithium hydroxide monohydrate ($LiOH.H_2O$), lithium hydroxide (LiOH), lithium carbonate ($Li_2CO_3$), lithium phosphate ($Li_3PO_4$), lithium phosphate dodecahydrate ($Li_3PO_4.12H_2O$), lithium oxalate ($Li_2C_2O_4$), and a mixture thereof.

The iron precursor added may be at least one selected from the group consisting of iron citrate ($FeC_6H_5O_7$), iron citrate hydrate ($FeC_6H_5O_7.nH_2O$), ferrous sulfate heptahydrate ($FeSO_4.7H_2O$), iron(II) oxalate dihydrate ($FeC_2O_4.2H_2O$), iron acetyl acetonate ($Fe(C_5H_7O_2)_3$), iron phosphate dihydrate ($FePO_4.2H_2O$), ferric hydroxide (FeO(OH)), and a mixture thereof.

The phosphorus precursor added may be at least one selected from the group consisting of tri-ammonium phosphate trihydrate (($NH_4)_3PO_4.3H_2O$), ammonium phosphate (($NH_4)_2HPO_4$), ammonium dihydrogen phosphate ($NH_4H_2PO_4$), phosphoric acid ($H_3PO_4$), and a mixture thereof.

Meanwhile, the mixing ratio of the lithium precursor, the iron precursor and the phosphorus precursor during the forming of the mixture solution is not specifically limited, and may be, for example, 0.1-10:1:0.1-10 by the molar ratio.

In addition, the iron precursor may be added from about 0.005 to about 1 parts by weight based on 1 part by weight of the triethanolamine reaction solvent, and the lithium precursor and the phosphorus precursor may be added by corresponding molar ratios considering the amount of the iron precursor.

A stirring step may be further conducted during preparing the mixture solution so that the lithium precursor, the iron precursor and the phosphorus precursor may be homogeneously dispersed in the triethanolamine reaction solvent.

Meanwhile, the reaction solvent may be triethanolamine which is a non-aqueous solvent and has a relatively high boiling point.

The boiling point of the triethanolamine is about 335° C.

The lithium iron phosphate nanopowder was verified to be synthesized at temperature conditions of at least about 150° C.

That is, when the above-described reaction solvents are used for preparing the lithium iron phosphate nanopowder, the reaction may be performed at a temperature less than or equal to the boiling point of the reaction solvent, and the vaporization degree of the reaction solvent may decrease.

Thus, the pressure increase due to vaporization of solvents during the performing of the reaction may be significantly suppressed when compared to a common hydrothermal synthesis method. Therefore, safety throughout the process may be improved.

In addition, since the above described triethanolamine reaction solvent is non-aqueous, the problem of iron oxidation may be solved without using a separate reducing agent.

Then, the mixture solution was put into a reactor and heated to prepare the lithium iron phosphate nanopowder under the pressure conditions of 1 bar to 10 bar (Step (b)).

The reactor may be a generally used reactor and may be an open type reactor or a closed-type reactor connected to a reflux, in which the pressure is not high, but is not limited thereto.

That is, the pressure conditions in Step (b) do not specifically require a pressure-resistant vessel that withstands a particularly high temperature and a high pressure. Thus, unlike the common hydrothermal synthesis method (at least about 100 bar), the supercritical hydrothermal synthesis method (at least about 220 bar) or the glycothermal synthesis method (from about 10 bar to about 100 bar), in which the use of a pressure-resistant vessel is necessary for preparing the lithium iron phosphate nanopowder, the method of the present invention does not require a high-pressure-resistant reactor, thereby improving process safety and economic feasibility.

Meanwhile, the above Step (b) may be performed at the temperature range of at least 150° C. which is the minimum temperature for synthesizing the lithium iron phosphate nanopowder, and at a temperature range less than or equal to the boiling point of the reaction solvent used.

Since the reaction solvent used in the present invention is triethanolamine, the above Step (b) may be performed at about 150° C. to about 335° C.

That is, the reaction is performed at a temperature between the minimum temperature for synthesizing the lithium iron phosphate nanopowder and a temperature less than or equal to the boiling point of the reaction solvent, and the vaporization of the reaction solvent is slowed down. Thus, the pressure increase of the reactor due to the vaporization of the solvent may be suppressed when compared to a common hydrothermal synthesis method, etc.

Meanwhile, the pressure in the reactor during the performing of the above Step (b) is in the range of 1 bar to 10 bar. The pressure is relatively lower when compared to that of the common hydrothermal synthesis method (at least about 100 bar), of the supercritical hydrothermal synthesis method (at least about 220 bar), or of the glycothermal synthesis method (from about 10 bar to about 100 bar), which provides even better effect when considering process safety and economic feasibility.

The processing time of the above Step (b) may be changed according to the reaction temperature.

In an embodiment of the present invention, the above Step (b) may be conducted at a temperature range of 150 to 335° C. for 1 to 72 hours, and more particularly, may be conducted at a temperature range of 180° C. to 335° C. for 1 to 48 hours.

When Step (b) is finished, lithium iron phosphate nanopowder particle may be synthesized, and a washing step and a drying step for recovering the synthesized lithium iron phosphate nanopowder particle in Step (b) may be conducted sequentially.

The washing method in the washing step is not specifically limited, and may be conducted sequentially by using acetone and methanol.

The drying method in the drying step is not specifically limited, and may be conducted at a temperature range of 20° C. to 160° C. for 2 to 40 hours.

The lithium iron phosphate nanopowder synthesized through the processes may be heat treated to form a coating layer on a portion or the whole of the surface of individual particle of the powder (Step (c)).

The above Step (c) may be performed through heat treating. The heat treating is not specifically limited and may be conducted by heating to a temperature range of 400° C. to 900° C., for example. Through the heat treating, a carbon coating layer or a coating layer composed of a glassy lithium compound may be formed on a portion or the whole of the surface of the particle.

When the coating layer is the carbon coating layer, the precursor of the coating layer may be the reaction solvent remaining on the surface of the particle after use. Particularly, the triethanolamine solvent used may remain on the surface of the particle after conducting the drying step and may be carbonized during the heat treatment at a temperature range of 400° C. to 900° C., thereby forming the carbon coating layer on the surface of the particle.

A separate organic compound may be used as the precursor of the carbon coating layer, and the addition step of the separate organic compound for forming the carbon coating layer on the surface of the lithium iron phosphate nanopowder particle is not specifically limited.

In an embodiment of the present invention, the organic compound may be mixed with the solvent together with the lithium precursor, the iron precursor and the phosphorus precursor and react to form the carbon coating layer on the surface of the particle during the forming of the lithium iron phosphate particle.

In another embodiment, the lithium precursor, the iron precursor and the phosphorus precursor are mixed with the solvent and react to form the lithium iron phosphate particle, and then, the organic compound is added, mixed and heat treated to form the carbon coating layer on the surface of the particle.

In further another embodiment, the lithium precursor, the iron precursor and the phosphorus precursor are mixed with the solvent and react to form the lithium iron phosphate particle, and washing and drying processes are performed. Thereafter, the organic compound is added, mixed and heat treated to form the carbon coating layer on the surface of the particle.

The organic compound is not specifically limited, and may be at least one selected from the group consisting of glucose, sucrose, galactose, fructose, lactose, starch, mannose, ribose, aldohexose, ketohexose, and a combination thereof.

When the coating layer is the glassy lithium compound coating layer, the coating layer is not specifically limited, and may be, for example, a lithium phosphate-based amorphous coating layer. In this case, the precursor material may be a lithium precursor and a phosphorus precursor, and may be an additional lithium compound and phosphorus compound.

The thickness of the carbon coating layer or the glassy lithium compound coating layer formed on the surface of the particle in this step is not specifically limited, and may be, for example, less than or equal to 10 nm.

Since the lithium iron phosphate powder has low electric conductivity, the electric conductivity of the lithium iron phosphate powder may be improved by forming the carbon coating layer or the coating layer including the glassy lithium compound on a portion of or the whole surface of the minute lithium iron phosphate powder particle thus prepared.

The lithium iron phosphate nanopowder particle prepared through the series of the above-described steps may have an olivine structure.

The particle size and the particle size distribution of the particle may be controlled by changing the lithium precursor, the iron precursor, or the phosphorus precursor, or regulating processing variables such as a reaction temperature and a reaction time, etc.

For example, the size of the lithium iron phosphate particle may decrease when using lithium acetate as the lithium precursor. In addition, the size of the lithium iron phosphate may increase when the reaction temperature is elevated or the reaction time is prolonged.

The particle size (Hereinafter will be referred to as particle diameter) of the lithium iron phosphate nanopowder prepared through the above-described processes is not specifically limited, and may be, for example, from 30 nm to 300 nm. The particle size distribution is not specifically limited and may be, for example, less than or equal to 50% of the average value of the particle diameter.

Preparation of Lithium Secondary Battery

In the present invention, a cathode active material including the lithium iron phosphate nanopowder having the olivine crystal structure may be provided. The cathode active material may further include a conductive agent, a binder and a filler other than the lithium iron phosphate powder selectively.

The conductive agent may include any material having conductivity and not inducing a chemical change in a battery without specific limitation, and may include graphite such as natural graphite and synthetic graphite; carbon blacks such as carbon black, acetylene black, ketchen black, channel black, furnace black, lamp black, and thermal black; conductive fibers such as a carbon fiber and a metal fiber; metal powders such as a carbon fluoride powder, an aluminum powder and a nickel powder; conductive whiskers such as zinc oxide and potassium titanate; conductive metal oxides such as titanium oxide; and conductive materials such as a polyphenylene derivative.

Generally, the conductive agent may be included by 1 wt % to 30 wt % based on the total amount of a mixture including the cathode active material.

The binder may be any component that assists the bonding of the active material and the conductive agent and the bonding with a current collector without specific limitation, and may include, for example, polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene monomer (EPDM), sulfonated EPDM, a styrene butadiene rubber, a fluorine rubber, various copolymers, etc.

Generally, the binder may be included by 1 wt % to 30 wt % based on the total amount of a mixture including the cathode active material.

The filler is a component suppressing the expansion of an electrode and may be selectively used. The filler may be any fibrous material that may not induce a chemical change in the battery, without specific limitation, and may include, for example, an olefin-based polymer such as polyethylene and polypropylene; and a fibrous material such as a glass fiber and a carbon fiber.

In addition, in an embodiment of the present invention, a cathode for a lithium secondary battery obtained by coating the cathode active material on a current collector is provided.

The cathode for the lithium secondary battery may be fabricated by, for example, dissolving the cathode active material in a solvent to prepare a slurry, coating the slurry on the current collector, drying and pressing.

The current collector of the cathode may be any material having conductivity and not inducing chemical change of a battery, without specific limitation, and may include, for example, stainless steel; aluminum; nickel; titanium; calcined carbon; or a surface treated material of the aluminum or the stainless steel with carbon, nickel, titanium, silver, etc.

Generally, the current collector may have a thickness of 3 μm to 500 μm, and minute embossing may be formed on the surface of the current collector to increase the adhesiveness of the cathode active material. Various shapes such as a film, a sheet, a foil, a net, a porous material, a foamed material, a non-woven fabric, etc. may be used as the current collector.

In addition, in an embodiment of the present invention, a lithium secondary battery including a cathode including the cathode active material, an anode, a separator and a non-aqueous electrolyte containing a lithium salt may be provided.

The anode may be fabricated by, for example, coating an anode mixture including an anode active material on an anode current collector, and drying. In the anode mixture, the above-described components such as the conductive agent, the binder and the filler may be included as occasion demands.

The anode current collector may be any material having high conductivity and not inducing the chemical change of a battery, without specific limitation, and may include, for example, copper; stainless steel; aluminum; nickel; calcined carbon; a surface treated material of copper or stainless steel with carbon, nickel, titanium, silver, etc.; and an alloy of aluminum-cadmium.

Meanwhile, the current collector may have the thickness of 3 μm to 500 μm, and minute embossing may be formed on the surface of the current collector to increase the adhesiveness of the anode active material as in the cathode current collector. Various shapes such as a film, a sheet, a foil, a net, a porous material, a foamed material, a non-woven fabric, etc. may be used as the current collector.

The separator is disposed between the cathode and the anode, and an insulating thin film having high ion transmittance and high mechanical strength may be used.

The pore diameter of the separator may be generally from 0.01 μm to 10 μm, and the thickness thereof may be generally from 5 μm to 300 μm.

The separator may include a chemical resistant and hydrophobic olefin-based polymer such as polypropylene; a sheet or a non-woven fabric formed by using a glass fiber or polyethylene, etc.

When a solid electrolyte such as a polymer is used as the electrolyte, the solid electrolyte may also play the role of the separator.

The non-aqueous electrolyte containing the lithium salt includes the electrolyte and the lithium salt, and the electrolyte may include a non-aqueous organic solvent or an organic solid electrolyte.

The non-aqueous organic solvent may include, for example, aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfuran, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

The organic solid electrolyte may include, for example, polyethylene derivatives, polyethylene oxide derivatives, polypropylene oxide derivatives, a phosphoric acid ester polymer, poly agitation lysine, polyester sulfide, polyvinyl alcohol, polyvinylidene fluoride, and a polymer containing an ionic dissociable group.

The lithium salt may include a material favorably soluble in the non-aqueous electrolyte such as LiCl, LiBr, LiI, $LiClO_4$, $LiBF_4$, $LiB_{10}C_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, a low molecular weight aliphatic lithium carbonate, lithium 4-phenylborate, imide, etc.

In addition, the electrolyte may further include (for improving charge and discharge properties, and flame retardance, etc.), for example, pyridine, triethyl phosphite, triethanolamine, a cyclic ether, ethylenediamine, n-glyme, hexaphosphoric acid amide, nitrobenzene derivatives, sulfur, a quinone imine dye, N-substituted oxazolidinone, N,N-substituted imidazolidine, an ethylene glycol dialkyl ether, an ammonium salt, pyrrole, 2-methoxyethanol, trichloro aluminum, etc. A halogen-containing solvent such as carbon tetrachloride, trifluoroethylene, etc. may be further included to impart incombustibility, and a carbon dioxide gas may be further included to improve preservation properties at a high temperature.

As described above, the method for preparing the lithium iron phosphate nanopowder of the present invention may be performed at relatively lower pressure conditions when compared to a common hydrothermal synthesis method, a supercritical hydrothermal synthesis method or a glycothermal synthesis method by using a novel triethanolamine reaction solvent as a non-aqueous solution. Thus, a high temperature/high pressure reactor is not necessary, and process safety and economic feasibility may be secured, a uniform particle size may be attained, and a lithium iron phosphate nanopowder having controlled particle size distribution may be easily prepared.

In addition, a lithium secondary battery including the lithium iron phosphate nanopowder thus prepared as a cathode active material may have good capacity and stability.

EXAMPLES

Exemplary embodiments of the invention will be described below in more detail. The present invention may, however, be embodied in different forms and should not be construed as limited to the embodiments set forth herein. Rather, these embodiments are provided so that this disclosure will be thorough and complete, and will fully convey the scope of the inventive concept to those skilled in the art.

Example 1

1.44 g of lithium hydroxide (LiOH), 14.7 g of ferric citrate ($FeC_6H_5O_7$) and 5.88 g of phosphoric acid ($H_3PO_4$)

were added in 300 ml of triethanolamine and sufficiently stirred to prepare a mixture solution.

The sufficiently stirred mixture solution was put into a 500 ml reactor and a reaction was respectively performed at 230° C. for 24 hours.

After finishing the reaction, the remaining reactant was cooled and washed sequentially using acetone and methanol.

After washing, the product was dried using a vacuum drier.

Figure 2:
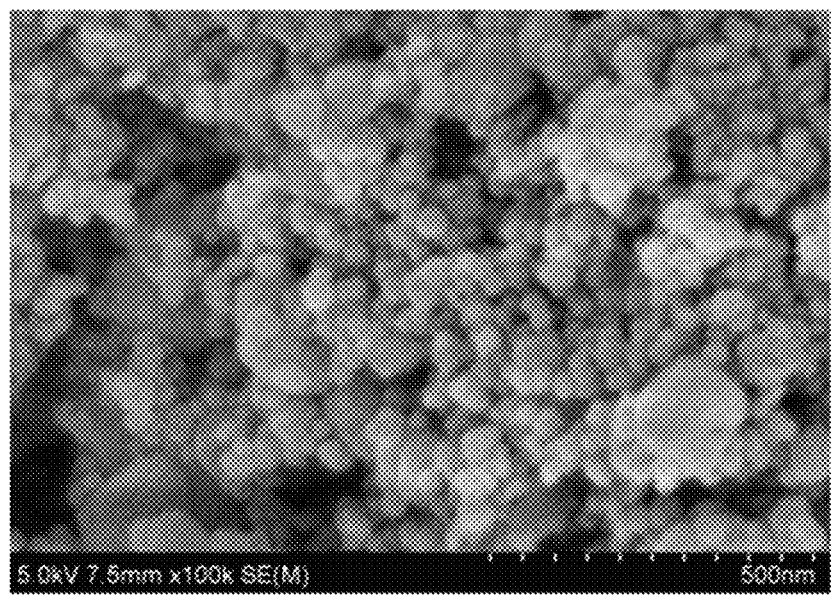
FIG. 2 is a photographic image of a scanning electron microscope (SEM) of a lithium iron phosphate nanopowder prepared according to an embodiment of the present invention (Example 1)

After finishing the washing and drying, the reaction product thus obtained was analyzed with an X-ray diffraction spectroscopy and a scanning electron microscope. The reaction product was confirmed to be a lithium iron phosphate nanopowder having a pure olivine crystal structure and including a mixture of particle having particle sizes of 30 nm and 100 nm (See FIGS. 1 and 2).

Figure 3:
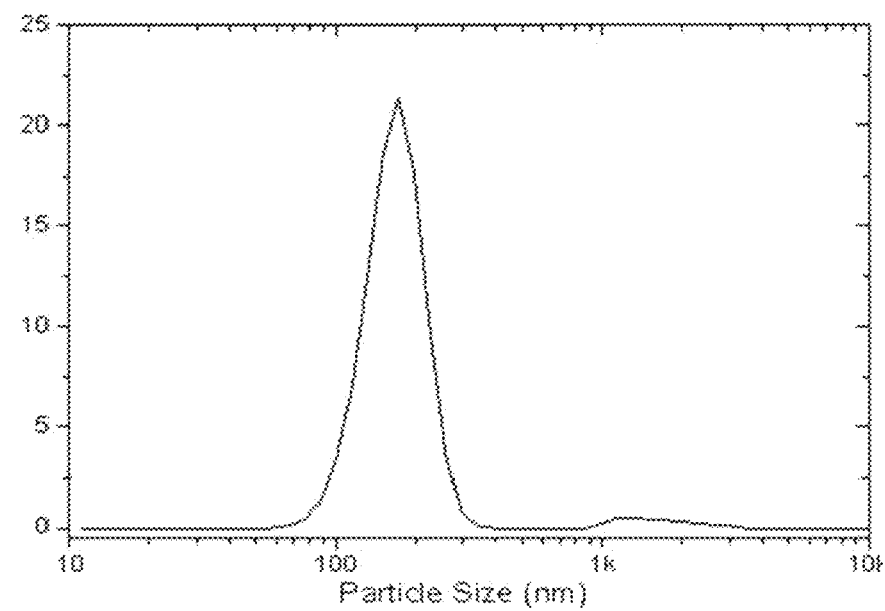
FIG. 3 illustrates particle size distribution of a lithium iron phosphate nanopowder prepared according to an embodiment of the present invention (Example 1)

In addition, the particle size distribution of the lithium iron phosphate nanopowder (Example 1b) was measured and is illustrated as a graph in FIG. 3. As shown in the graph, the particle size distribution is uniform.

Examples 2a and 2b

The lithium iron phosphate nanopowder prepared in Example 1 was heat treated in a furnace at 600° C. (Example 2a) and at 700° C. (Example 2b), respectively to obtain a lithium iron phosphate nanopowder including a carbon coating layer formed thereon.

Figure 4:
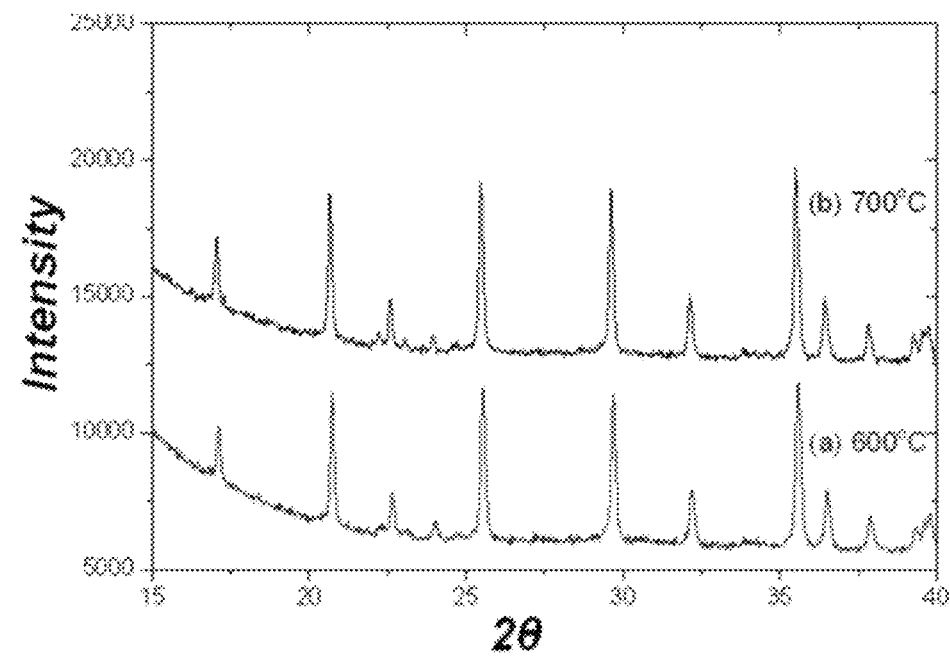
FIG. 4 illustrates X-ray diffraction (XRD) patterns of lithium iron phosphate nanopowders prepared according to embodiments of the present invention (Examples 2a and 2b)
Figure 5:
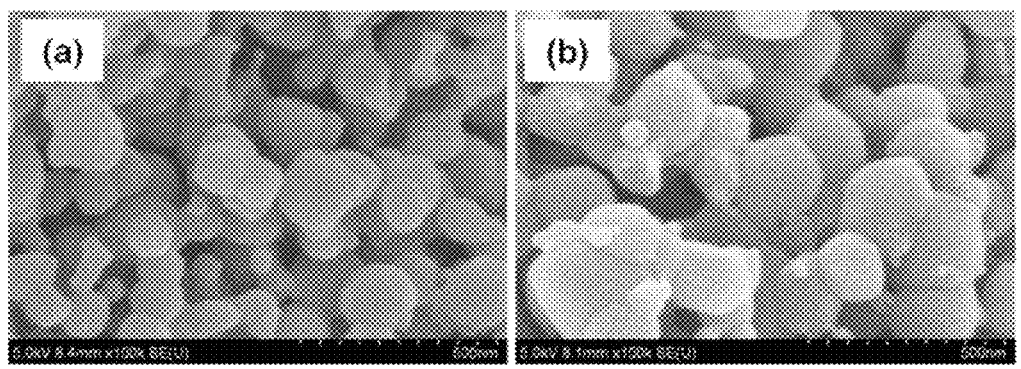
FIG. 5 illustrates photographic images of a scanning electron microscope (SEM) of lithium iron phosphate nanopowders prepared according to embodiments of the present invention (Examples 2a and 2b).

The reaction product thus obtained was analyzed with an X-ray diffraction spectroscopy and a scanning electron microscope. The reaction product was confirmed to be a lithium iron phosphate nanopowder having a particle size of 100 nm of pure olivine crystal structure when the heat treatment was performed at 600° C. (Example 2a), and a lithium iron phosphate nanopowder having a particle size of 150 nm of pure olivine crystal structure when the heat treatment was performed at 700° C. (Example 2b), respectively (See FIGS. 4 and 5).

As shown through the examples, the lithium iron phosphate nanopowder prepared by the method of the present invention has small and uniform particle size and good particle size distribution properties.

What is claimed is:

1. A method for preparing a lithium iron phosphate nanopowder, comprising the steps of:
   (a) preparing a mixture solution by adding a lithium precursor, an iron precursor and a phosphorus precursor in a triethanolamine solvent, which is a non-aqueous solvent; and
   (b) putting the mixture solution into a reactor and heating to prepare the lithium iron phosphate nanopowder under pressure conditions of 1 bar to 10 bar and at a temperature range of 150 to 335° C.

2. The method for preparing a lithium iron phosphate nanopowder of claim 1, further comprising the step of (c) heat treating the lithium iron phosphate nanopowder thus prepared to form a coating layer at a portion or a whole of a surface of an individual particle of the nanopowder.

3. The method for preparing a lithium iron phosphate nanopowder of claim 1, wherein the lithium iron phosphate nanopowder prepared in Step (b) is sequentially conducted a washing step and a drying step.

4. The method for preparing a lithium iron phosphate nanopowder of claim 1, wherein Step (b) is performed at a temperature less than or equal to a boiling point of the triethanolamine solvent.

5. The method for preparing a lithium iron phosphate nanopowder of claim 1, wherein Step (b) is performed for 1 to 72 hours.

6. The method for preparing a lithium iron phosphate nanopowder of claim 1, wherein the lithium precursor is at least one selected from the group consisting of lithium acetate dihydrate ($CH_3COOLi.2H_2O$), lithium hydroxide monohydrate ($LiOH.H_2O$), lithium hydroxide (LiOH), lithium carbonate ($Li_2CO_3$), lithium phosphate ($Li_3PO_4$), lithium phosphate dodecahydrate ($Li_3PO_4.12H_2O$), lithium oxalate ($Li_2C_2O_4$), and a mixture thereof.

7. The method for preparing a lithium iron phosphate nanopowder of claim 1, wherein the iron precursor is at least one selected from the group consisting of iron citrate ($FeC_6H_5O_7$), iron citrate hydrate ($FeC_6H_5O_7.nH_2O$), ferrous sulfate heptahydrate ($FeSO_4.7H_2O$), iron(II) oxalate dihydrate ($FeC_2O_4.2H_2O$), iron acetyl acetonate ($Fe(C_5H_7O_2)_3$), iron phosphate dihydrate ($FePO_4.2H_2O$), ferric hydroxide (FeO(OH)), and a mixture thereof.

8. The method for preparing a lithium iron phosphate nanopowder of claim 1, wherein the phosphorus precursor is at least one selected from the group consisting of triammonium phosphate trihydrate (($NH_4)_3PO_4.3H_2O$), ammonium phosphate (($NH_4)_2HPO_4$), ammonium dihydrogen phosphate ($NH_4H_2PO_4$), phosphoric acid ($H_3PO_4$), and a mixture thereof.

9. The method for preparing a lithium iron phosphate nanopowder of claim 2, wherein the heat treating is performed by heating to a temperature range of 400° C. to 900° C.

10. The method for preparing a lithium iron phosphate nanopowder of claim 3, wherein the drying is performed at 20° C. to 160° C. for 2 to 40 hours.

* * * * *